United States Patent
Perentes et al.

(10) Patent No.: US 10,421,604 B2
(45) Date of Patent: Sep. 24, 2019

(54) SYSTEM FOR PREPARING FOOD OR DRINK BEVERAGES FROM A PACK

(71) Applicant: NESTEC S.A., Vevey (CH)

(72) Inventors: Alexandre Perentes, Pully (CH); Youcef Ait Bouziad, Echandens (CH)

(73) Assignee: Societe des Produits Nestle S.A., Vevey (CH)

(*) Notice: Subject to any disclaimer, the term of this patent is extended or adjusted under 35 U.S.C. 154(b) by 147 days.

(21) Appl. No.: 15/524,816

(22) PCT Filed: Oct. 27, 2015

(86) PCT No.: PCT/EP2015/074852
§ 371 (c)(1),
(2) Date: May 5, 2017

(87) PCT Pub. No.: WO2016/071155
PCT Pub. Date: May 12, 2016

(65) Prior Publication Data
US 2017/0355514 A1     Dec. 14, 2017

(30) Foreign Application Priority Data

Nov. 6, 2014    (EP) .................................... 14191974

(51) Int. Cl.
*B65D 85/804*     (2006.01)
*A47J 31/44*      (2006.01)
(Continued)

(52) U.S. Cl.
CPC ........ *B65D 85/8043* (2013.01); *A47J 31/407* (2013.01); *A47J 31/4492* (2013.01); *B65D 75/5883* (2013.01)

(58) Field of Classification Search
CPC ............ B65D 85/8043; B65D 75/5872; B65D 75/5883; B65D 2203/00; A47J 31/407; A47J 31/4492
See application file for complete search history.

(56) References Cited

U.S. PATENT DOCUMENTS 6,698,333 B2 *  3/2004 Halliday ............. A47J 31/4492
                                                       426/77
7,597,922 B2 * 10/2009 Cheng ..................... A23L 27/00
                                                      426/594
(Continued)

FOREIGN PATENT DOCUMENTS

CN      2938283 Y     8/2007
EP      2786682       10/2014
(Continued)

*Primary Examiner* — Eric Keasel
(74) *Attorney, Agent, or Firm* — K&L Gates LLP

(57) ABSTRACT

The invention refers to a pack (10) for preparing food or beverage products comprising: at least one container (10') having an inner volume where at least one base ingredient for the preparation of the food or beverage product is stored, said inner volume being defined by sheets of material joined to one another at their edges; a fitment assembly (20) through which the food or beverage product is delivered, and identification means (30) comprising the information on the food or beverage product to be prepared; wherein the identification means (30) are arranged at least on one side of the edges of the container with respect to the fitment assembly (20), the identification means (30) being further arranged in the vicinity of said fitment assembly (20).

19 Claims, 8 Drawing Sheets

(51) Int. Cl.
*B65D 75/58* (2006.01)
*A47J 31/40* (2006.01)

(56) References Cited

U.S. PATENT DOCUMENTS

| | | | |
|---|---|---|---|
| 7,658,286 B2 * | 2/2010 | Murray | B65B 43/04 206/459.1 |
| 8,459,179 B2 * | 6/2013 | Ozanne | A47J 31/407 426/232 |
| 2004/0137128 A1 | 7/2004 | Hayes et al. | |
| 2010/0078480 A1 * | 4/2010 | Aker | G06K 19/06009 235/462.08 |
| 2011/0100506 A1 * | 5/2011 | Zabludovsky-Nerubay | B65D 75/5883 141/94 |

FOREIGN PATENT DOCUMENTS

| | | |
|---|---|---|
| JP | 2011255964 A | 12/2011 |
| WO | 9905044 A1 | 2/1999 |
| WO | 0158786 | 8/2001 |
| WO | 2005063091 A1 | 7/2005 |
| WO | 2011024103 A1 | 3/2011 |
| WO | 2014125123 | 8/2014 |
| WO | 2016023724 A1 | 2/2016 |
| WO | 2016023725 A1 | 2/2016 |
| WO | 2016023727 A1 | 2/2016 |
| WO | 2016023728 A1 | 2/2016 |
| WO | 2016023729 A1 | 2/2016 |
| WO | 2016023730 A1 | 2/2016 |

* cited by examiner

SYSTEM FOR PREPARING FOOD OR DRINK BEVERAGES FROM A PACK

CROSS REFERENCE TO RELATED APPLICATIONS

The present application is a National Stage of International Application No. PCT/EP2015/074852, filed on Oct. 27, 2015, which claims priority to European Patent Application No. 14191974.6, filed on Nov. 6, 2014, the entire contents of which are being incorporated herein by reference.

FIELD OF THE INVENTION

The present invention relates to a system for preparing food or beverages from a pack, in particular a flexible pack, which comprises the food or beverage base ingredients: the pack also comprises identification means having the information on the process parameters to be applied to the food or beverage base ingredients so that an optimised product is delivered.

BACKGROUND OF THE INVENTION

Preparing food or beverages from flexible packs or containers which comprise the food or beverage ingredients is known in the state of the art, such as per documents WO 99/05044 or WO 2011/024103 for example. These flexible containers or packs have generally the advantage to semi-rigid and rigid containers, typically with the shape of a capsule, that less amount of material is used to pack the product which leads to overall less production costs, to lower life cycle impacts shown in several life-cycle assessments and to advantages on the part of the user, who will need less available space for storing these packs, as they are more compact.

In order to allow a correct preparation of the food or beverage product from the food or beverage base ingredients which are comprised in these flexible packs or containers, identifiers comprising data for the process to be applied are provided: for example, document WO 2005/063091 A1 discloses a system for preparing a beverage departing from a container which can be a flexible bag comprising a plurality of coffee pouches, the container comprising an identifier with data for the brewing process to be applied to obtain the beverage. However, these identifiers can be damaged or can for example contain errors, in which case the system will not be able to correctly read the information and typically, a default brewing process will be applied, resulting in a non-optimised final product for the consumer. Moreover, this document describes that the identifier comprises an element which is detached from the container or which is provided separately from the container, this element comprising the data for the brewing process to be applied. The problem of these configurations is that the consumer needs to either torn and detach the element carrying the data or needs to introduce this separate element together with the container in the machine, which makes the process not comfortable from the user's point of view.

Therefore, it would be desirable to provide a system for preparing food or beverages in an optimised way departing from a flexible pack or container which comprises the data for the correct processing of these ingredients, such that the system is able to read the data in a reliable manner and minimising any possibility of errors. Moreover, it is also an object of the present invention to provide a system which is easy and comfortable to use for the consumer.

The present invention comes to provide a solution to the above-described needs, as it will be further explained. The invention also aims at other objects and particularly at the solution of other problems as will appear in the rest of the present description.

SUMMARY OF THE INVENTION

According to one aspect, the present invention refers to a pack for preparing food or beverage products comprising at least one container having an inner volume where at least one base ingredient for the preparation of the food or beverage product is stored, said inner volume being defined by sheets of material joined to one another at their edges; a fitment assembly through which the food or beverage product is delivered, and identification means comprising the information on the food or beverage product to be prepared. The identification means are arranged at least on one side of the edges of the container with respect to the fitment assembly being further arranged in the vicinity of said fitment assembly.

According to the invention, the identification means are preferably arranged on both sides of the edges of the container with respect to the fitment assembly, being arranged so that part of the information of the food or beverage product is on one of the sides and is continued on the other side.

According to a different embodiment, the identification means can also be arranged on both sides of the edges of the container with respect to the fitment assembly, being further configured to comprise a plurality of times the information on the food or beverage product.

Preferably, the identification means are configured so as to be reversibly read independently on the sense in which the pack has been introduced in a preparation device. More preferably, the identification means are arranged partly on one side of the container up to a length $h_1$ and partly on the other side of the container up to a length $h_2$, configured in such a way that $h_2 \leq h_1$.

According to the invention, the identification means comprise punched holes configured as a punched-hole code. Typically, the identification means are configured either as an optically-read code or as a mechanically-detected code.

Further according to the invention, the identification means comprise the information on the process parameters to process the base ingredients in the container or containers. These process parameters are at least one or a combination of the following: temperature of a fluid introduced in the single or plurality of containers, total volume of fluid and fluid flow introduced in the single or plurality of containers. Typically, the identification means further comprise the information on the sequential processing of the containers, when the pack comprises a plurality of containers. Preferably, the identification means further comprise specific information on the side of the container that is being read, once the pack is introduced in a device to prepare the corresponding food or beverage product.

According to another aspect, the invention refers to a range of packs wherein the packs differ by the value of their total volume height sharing a common lower part of height $h_0$, the identification means being arranged in said common lower part.

According to yet another aspect, the invention refers to a system for preparing a food or beverage product, comprising a pack as described previously and a device where the product is prepared, the device comprising a data reader configured to be confronted with the identification means in the pack when the pack is positioned in the device.

Preferably, according to one embodiment, the data reader comprises a light emitter device to retrieve the information on the product from the identification means in the pack.

According to another embodiment, the data reader comprises a plurality of pins engaging with the identification means in the pack.

Typically, the fitment assembly of the pack is configured so as to confront the data reader in the device with the identification means in the pack when the pack is positioned in the device.

Preferably, the identification means comprise the information on the process parameters to process the base ingredients in the container or containers in the device.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1A:
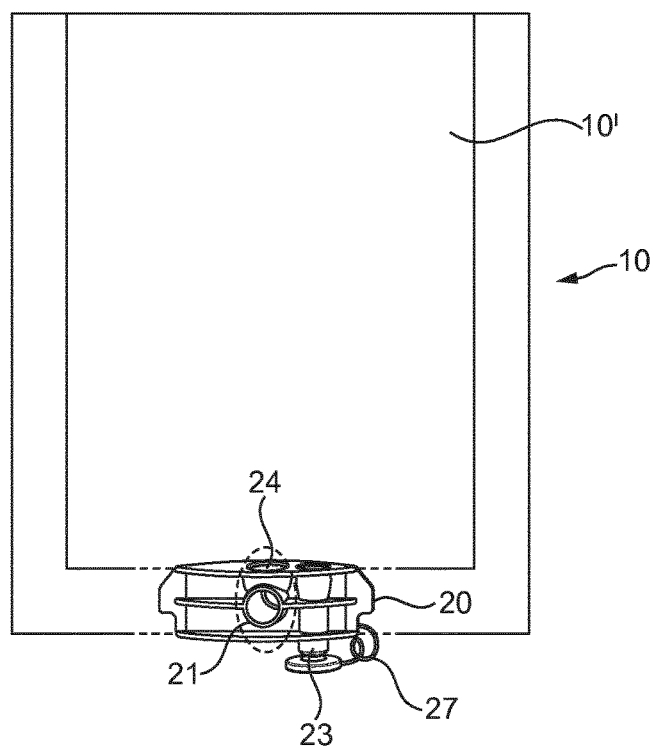
FIG. 1a shows a general view of a pack comprising one container and a fitment assembly for use in a system for preparing food or beverages according to the present invention.

The present invention relates to a system 100 for preparing food or beverages from a pack 10, preferably a flexible pack. The pack 10 comprises the food or beverage base ingredients which will be processed inside the pack in order to obtain the final food or beverage product. As it will be further explained in detail, the pack 10 also comprises identification means 30 comprising the information on the process parameters to be applied to the food or beverage base ingredients so that an optimised product is delivered. The system 100 of the invention also comprises a device 40 for preparing the food or beverages from the pack 10.

According to the present invention the food or beverage base ingredients of the pack can be comprised within the list of: soups, fruit juices, vegetable juices, bouillons, coffee, chocolate, tea, milk or creamer, smoothies, purees, coulis, creams or a combination thereof. The food or beverage base ingredients can be a soluble food or beverage ingredient. Preferably the food or beverage ingredient is a soluble food or beverage ingredient selected in the list of:

instant coffee powder, milk powder, cream powder, instant tea powder, cocoa powder, soup powder, fruit powder or mixture of said powders, a coffee concentrate, a milk concentrate, a syrup, a fruit or vegetable concentrate, a tea concentrate, a fruit or vegetable puree.

The powders can be agglomerated or sintered. The powders or liquid concentrates can be mixed with solid pieces for example for preparing soups with solid pieces. The food or beverage ingredient can also be an infusable food or beverage ingredient like a roast and ground coffee or tea leaves. In that embodiment water extracts the infusable ingredient.

In the present invention fluid covers any aqueous diluent that can be mixed with a soluble beverage ingredient to prepare a beverage or with a food ingredient to prepare a food product, like water, carbonated water, milk, etc. However, according to the invention, water is the preferred fluid which will be used.

The pack 10 used in the system 100 of the invention preferably comprises two flexible water impermeable sheets joined to one another to define an inner volume where at least one ingredient for the preparation of a food or beverage product is stored. The pack 10 comprises at least one container 10', though it can also comprise a plurality of containers 10', 10", 10''', etc. when a multiple product is to be prepared. In the case of a multiple product preparation from a pack 10, the pack 10 will comprise a plurality of containers, each container comprising at least one of the food or beverage ingredients for the preparation of the final multiple product: this has the advantage of storing the different ingredients separately so that they are well preserved during storage until the moment they are prepared.

Preferably, the pack 10 presents an essentially plane shape, the pack itself being substantially flexible and looking like a pouch or sachet. By flexible, it is meant that the sheets can be bent easily. The resulting pack 10 can be bent also, as it is soft and can be deformed contrary to rigid containers. The flexible sheet material can be plastic laminates, metallised foil or alufoil or fibre base material. According to the invention the two flexible water impermeable sheets can be formed of one single flexible water impermeable sheet folded in half and joined at its free edges.

The pack 10 can also comprise an excrescence enabling its handling by the user or consumer (not shown in the figures).

The pack 10 of the invention also comprises a fitment assembly 20: the fitment assembly 20 acts as fluid inlet, through which a fluid is introduced in the pack 10 for the preparation of the food or beverage product, and also acts as product outlet, through which the final food or beverage product is dispensed, once having been prepared. The fitment assembly 20 comprises at least one primary fluid inlet 21 through which fluid is injected in the container of the pack 10, as shown in FIG. 1a. When the pack 10 comprises a plurality of containers 10', 10", etc. typically when it comprises two containers, 10' and 10", the fitment assembly 20 will then comprise at least one primary fluid inlet 21 (typically arranged on a frontal side of the spout assembly 20) communicating with one container 10' and at least one secondary fluid inlet 22 (typically arranged on a rear side of the spout assembly 20) communicating with another container 10". In this case, a multiple food or beverage product is typically prepared and fluid is supplied into the containers 10', 10" sequentially through the primary and secondary fluid inlets 21, 22, as a function of the product to be dispensed, in order to properly mix the ingredients and prepare the corresponding food or beverage product. It is also possible that a fitment assembly 20 comprising a primary fluid inlet 21 and a secondary fluid inlet 22 is used for a pack 10 having only one container 10' (i.e., used for the preparation of a single product): in this case, fluid will be injected into the container 10' either through the primary fluid inlet 21 or through the secondary fluid inlet 22, depending on the side of introduction of the pack 10 in the preparation device. In other words, the fitment assembly 20 will be the same for packs having one or a plurality of containers but, when used in a pack with only one container, then only one of the fluid inlets will be typically used. This has the advantage of repeatability of elements and lower manufacturing and replacement costs for the fitment assembly 20.

In the case of the pack 10 comprising two containers 10' and 10", each of these containers will comprise one base ingredient for the preparation of a final food or beverage product, which will be made out of a recipe combining the ingredients from the two containers. In such an example, the primary fluid inlet 21 is connected to the container 10', whereas the secondary fluid inlet 22 is connected to the container 10": in this case, the fitment assembly 20 is configured so that fluid can be supplied sequentially into the containers, for example first supplying fluid into the container 10' through the primary fluid inlet 21, so a first component of the product is delivered, and secondly supplying fluid into the secondary container 10" through the secondary fluid inlet 22, so that a second component of the product is delivered, in order to prepare the appropriate recipe. Depending on the recipe and therefore on the ingredients in the containers, their processing order is established: proper information on the processing sequence is provided in the identification means 30 as it will be further explained in more detail.

Figure 1B:
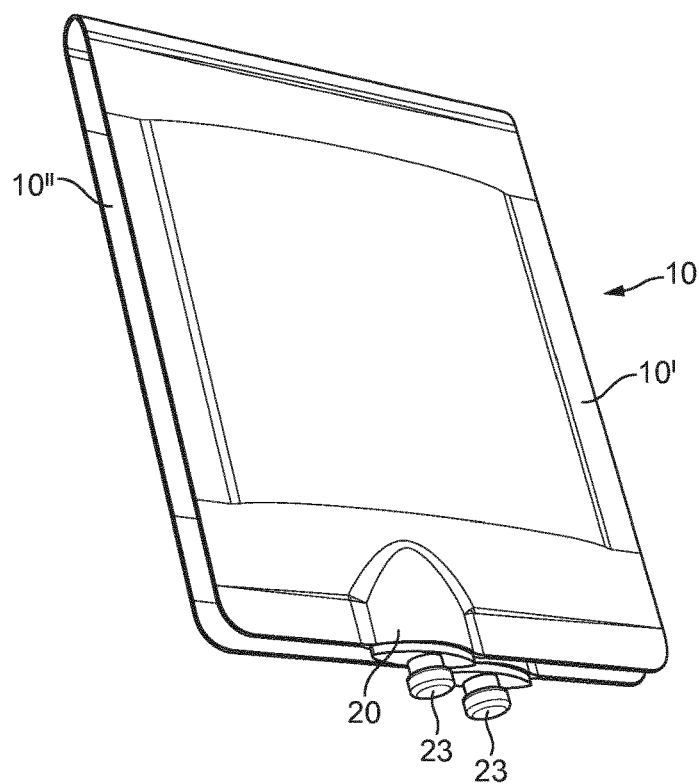
FIGS. 1b and 1c show general views of a pack comprising two containers and a fitment assembly for use in a system for preparing food or beverages according to the present invention.
Figure 1C:
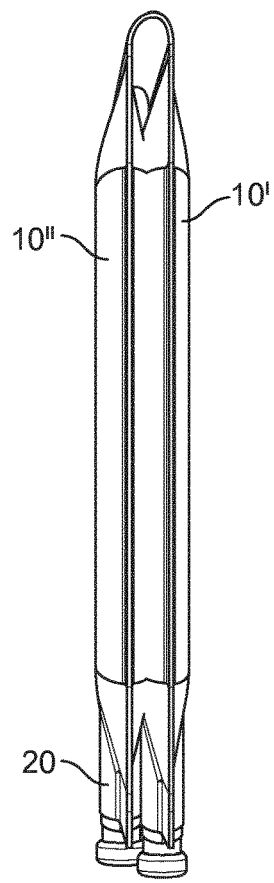

As shown in FIGS. 1b and 1c the fitment assembly 20 is preferably arranged in such a way that it brings together the plurality of food or beverage containers, in order to provide a sequential extraction of them.

Preferably, the pack 10 presents an essentially plane shape, wherein the fitment assembly 20 is arranged on one of the sides of the pack 10.

The fitment assembly 20 also comprises at least one dispensing fluid outlet 23 through which the single or multiple product is dispensed. The dispensing fluid outlet 23 is preferably configured so that it delivers the product as a free flow, meaning that the product can flow from the dispensing outlet 23 by simple gravity fall. According to a preferred embodiment of the invention, the dispensing fluid outlet 23 comprises an opening 230 at the bottom of the fitment assembly 20, said opening 230 having a transverse section with a surface area equivalent to the surface of a circular surface of diameter of at least 1 mm, preferably at most 4 mm, even more preferably comprised between 1.5 and 3 mm. The dispensing fluid outlet 23 is typically configured as a straight tube oriented essentially vertically in the fitment assembly 20, comprising at its end an opening 230. The length of the tube is preferably of at least 5 mm. Such a length generally enables a finalisation of the froth of the product, typically a beverage, before it is delivered in a drinking cup. An advantage of using such a dispensing fluid outlet 23 is that there is no need to implement a particular connection between the outlet and the machine when a food or beverage product is produced in order to direct the flow of the product delivered: the food or beverage product can flow from the dispensing fluid outlet 23 directly into a drinking cup or appropriate recipient.

According to the invention, before the food or beverage preparation step, the dispensing fluid outlet 23 is closed at its end. Generally the dispensing outlet is closed by manufacturing and is configured for being opened at food or beverage production step. By "closed by manufacturing" it is meant that a complete pack, comprising the containers and the fitment assembly 20, is manufactured with a closed dispensing fluid outlet 23. This closure guarantees hygienic and shelf life protection. The dispensing outlet 23 can be opened by a machine or manually.

Figure 2A:
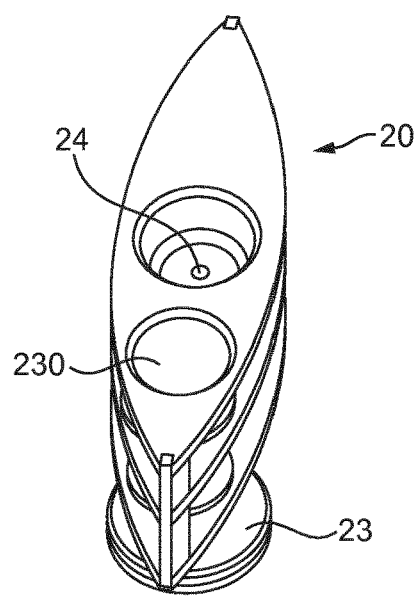
FIGS. 2a, 2b and 2c show different views of a possible embodiment of a fitment assembly for a pack to be used in a system for preparing food or beverages according to the present invention.
Figure 2B:
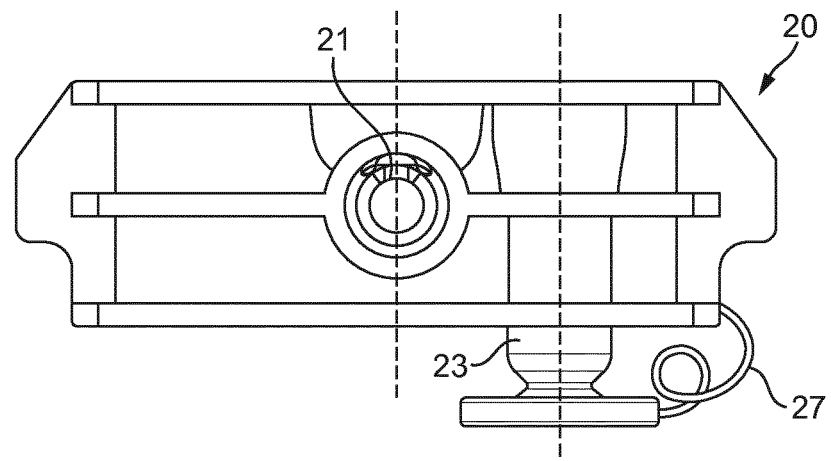
Figure 2C:
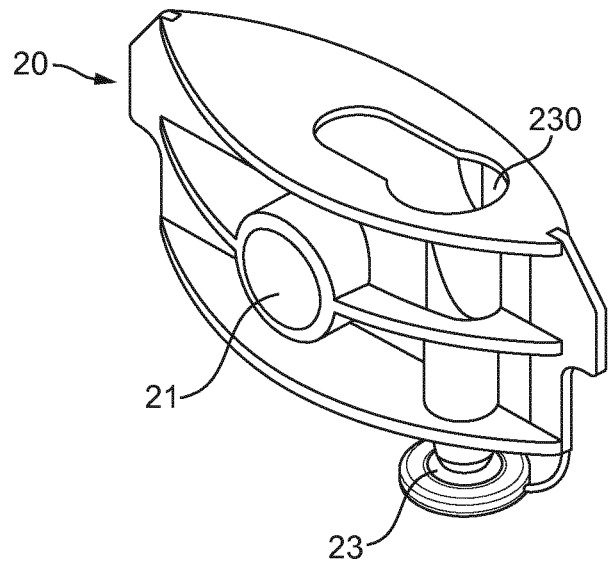

Preferably the dispensing fluid outlet 23 is closed by a plug 27, as represented schematically in FIG. 1a or 2b, said plug 27 comprising means for maintaining it attached to the fitment assembly 20 after the opening of the dispensing outlet 23. Consequently the plug 27 does not fall in the beverage or food during its production. The means for maintaining the plug 27 attached to the fitment assembly 20 can be a plastic bond attached to the fitment assembly 20, for example, or any other suitable means providing a similar effect. Moreover, the dispensing fluid outlet 23 can also comprise a weakened area near the plug 27: this weakened area can be made for example as a narrowing of the dispensing outlet tube so that it is easier to cut or tear off the plug 27 by the machine.

Preferably the plug 27 is part of one single fitment assembly 20 comprising the dispensing outlet and the fluid inlet. In particular when the fitment assembly 20 is made by injection moulding, the design of the mould also comprises the plug 27. In the same manner the plastic bond can also be part of the design of the fitment assembly 20 when it is made by injection moulding, which again provides advantages from a manufacturing point of view, as the same part comprises the fluid inlet, the plug 27 and the bond.

The fitment assembly 20 is preferably rigid and is made of a rigid plastic material, preferably by injection moulding. Typically, this plastic material can be selected from the following: polypropylene, polyethylene, polyethylene terephthalate and polylactic acid. Also according to a less preferred embodiment the fitment assembly 20 can be made of a metal like aluminium or tin-plate.

Preferably, the fluid inlets 21, 22 are piercable by injecting means 41, typically piercing and injecting means 41, preferably a fluid needle, called in what follows needle, such that these injecting means 41 typically comprise an inner duct or pipe through which high pressure fluid is injected in the fluid inlets 21, 22. However, it is also possible that these fluid inlets 21, 22 are directly accessible by injecting means which will inject fluid directly without the need to pierce any external lid or membrane in these fluid inlets.

Figure 3A:
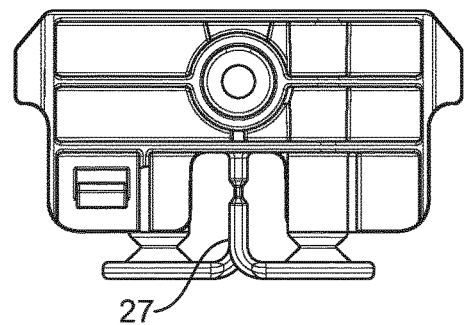
FIGS. 3a, 3b and 3c show different views of another possible embodiment of a fitment assembly for a pack to be used in a system for preparing food or beverages according to the present invention.
Figure 3B:
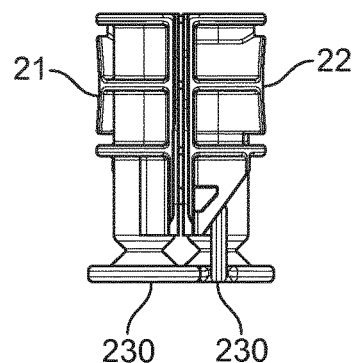
Figure 3C:
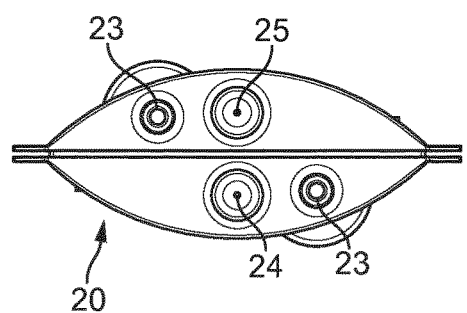

Preferably, fluid is injected at a pressure higher than 2 bar, more preferably higher than 3 bar, preferably comprised between 2 and 10 bar, more preferably of around 7 bar. The fluid inlets 21, 22 are configured in such a way that the high pressure fluid injected through them by the injecting means 41 is converted into a high velocity jet, which is driven into the container or containers. Typically, the diameter of the fluid inlets is comprised between 1 mm and 4 mm, more preferably between 1.5 mm and 3 mm. The fluid inlets 21, 22 preferably comprise a yieldably cover over it which can be pierced by the injecting and piercing means 41. The injecting means 41 also comprise a toroidal ring, preferably made of rubber, ensuring that there is no leakage of fluid outside the fluid inlet while the injecting means 41 are injecting fluid into the fluid inlet. Each fluid inlet is communicated with the inside volume of the container through an injection hole (in FIG. 3c, a primary injection hole 24 corresponds to the primary fluid inlet 21 and a secondary injection hole 25 corresponds to the secondary fluid inlet 22): each of these injection holes has a diameter of at most 1 mm, preferably of at least 0.24 mm, preferably comprised between 0.3 mm and 1 mm, preferably between 0.3 and 0.5 mm, more preferably of about 0.4 mm. With such a configuration, the high pressure fluid injected by the injecting means 41 is conveyed internally in the fluid inlet towards the injection hole, from which it is converted into a high velocity jet of fluid inside the container when passing through the small section injection hole. Typically, this jet of fluid provided in the container has a velocity of at least 20 m/s.

The fluid jet which is created inside the container avoids that the food or beverage product flows through the dispensing outlet too rapidly: therefore, the time of agitation of the ingredient together with the fluid inside the container volume is increased.

According to the invention, the fluid inlets can also be configured for providing an orientable high velocity jet into the containers, preferably at about 90° with respect to the fluid supply provided into the fluid inlets by the injecting means 41, though any other angle would be possible and comprised within the scope of the present application.

As described, the fluid inlets in the fitment assembly 20 are configured for introducing the fluid under the form of a jet in the inner volume of the containers. By jet it is understood a stream of liquid or fluid that comes out of the fluid inlet and into the inner volume of the food or beverage container quickly and with force. Therefore, the fluid inlet is configured for introducing fluid in the inner volume of the container with a high velocity, this fluid jet preferably presenting a velocity of at least about 20 m/s, preferably at least 30 m/s. As previously described, such a configuration is preferably obtained in the present invention by placing a constriction (that of the injection hole) in the fluid path in the fluid inlet to reduce the size of the section of the fluid inlet. Due to the small surface of the injection hole through which the fluid goes into the inner volume of the container, the pressurized fluid creates a jet in the inner volume of the container.

The small surface of the injection holes presents the advantage of avoiding any back flow of fluid from the inner volume of the container into the fluid inlet. For the same fluid to be provided through the fluid inlets, the surface of the injection hole can vary according to the nature of the food and beverage ingredient inside the container which is to be mixed with the fluid. In particular when the ingredient is difficult to dissolve a smaller injection hole creates a jet with a higher velocity which improves agitation and dissolution of this ingredient in the container.

It is also possible according to another embodiment of the invention that the injecting means in the preparation device will introduce a fluid, typically water, inside the pack 10 through the fitment assembly 20, at a low pressure, typically less than 1 bar, more preferably at about 0.5 bar for the infusion of the beverage or for its extraction. As the pressure is low, there is no problem of tightness with the pack 10: the fluid is introduced by the injecting means in a continuous way during a certain time and under a certain flow rate: this information is comprised in the identification means 30. The fluid injected by the injecting means is hot, and is preferably provided at a temperature comprised between 60° C. and 95° C.

Figure 9:
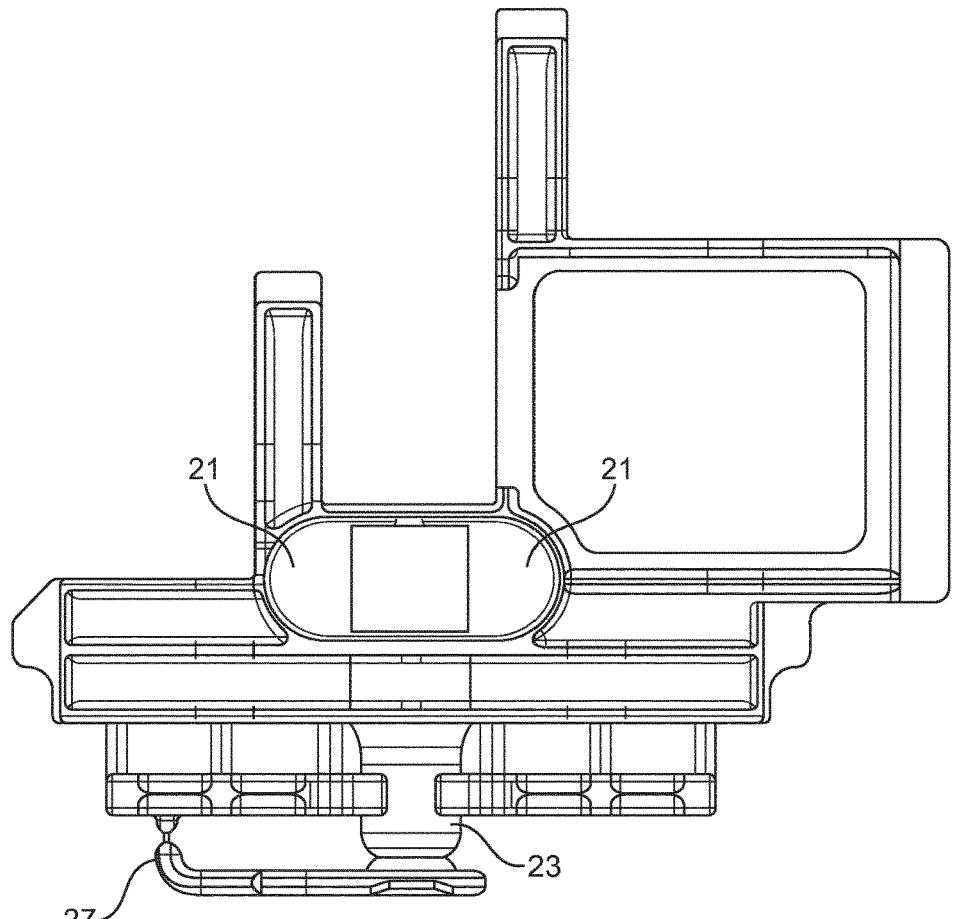
FIG. 9 shows yet another possible embodiment of a fitment assembly for a pack to be used in a system for preparing food or beverages according to the present invention.

In this case, when the food or beverage product is infused, the fitment assembly 20 is configured differently from the one described, preferably as shown in FIG. 9: in this case, no jet is injected towards the upper part of the pack, but fluid in introduced through the primary fluid inlet 21 at a low pressure and is then conveyed upwardly through the inner part of the container where the food or beverage product is arranged and is infused. Once the product has been prepared in the pack, it is dispensed through the dispensing fluid outlet 23. The fitment assembly 20 is also configured to be reversible so that it can be pierced and fluid can be introduced frontally or reversibly.

Preferably, according to the invention, the pack 10 presents a plane shape oriented along a plane essentially vertically oriented during beverage production and the fluid inlet orientates the jet of fluid in a direction comprised in said plane. The fluid jet introduced from the bottom into the container is developing into circular and spiral movements creating turbulences, frictions and high contact surfaces between the fluid molecules (typically, water molecules) and the ingredient particles. In average the fluid molecules have several turns within the container until they leave it together with the beverage or food product once mixed. Best results (reconstitution) have been observed with a pack of rectangular shape. Packs with single spout assembly placed in the corner of a rectangular pack have also been found to improve reconstitution.

According to the invention, the food or beverage containers are arranged essentially vertically during the production and dispensing of the single or multiple product, and the fitment assembly 20 is arranged in such a way that the fluid coming through the fluid inlets is supplied into the containers in an upward direction.

The fitment assembly 20 of the invention is preferably configured under rotational symmetry of order 2, also called 2-fold rotational symmetry or discrete rotational symmetry of the second order, with respect to a longitudinal central axis: therefore, the fitment assembly 20 is reversible and can be operated in one sense or the other in a machine. The preferred embodiments of the invention are those of rotational symmetry of order 2, i.e., where n=2, but other embodiments of the fitment assembly 20 having rotational symmetry with different values of n would also be possible and comprised within the scope of the present application. The fitment assembly 20 can be made of two substantially identical composing parts attached together or it can be made of only one composing part. For a certain embodiment or configuration, similar outer shape and similar external configuration as to fluid inlets and injecting and piercing means are provided by either the fitment assembly 20 made of two composing parts or made of one single composing part, which allows that any of them can be used in the same machine or device.

Figure 6:
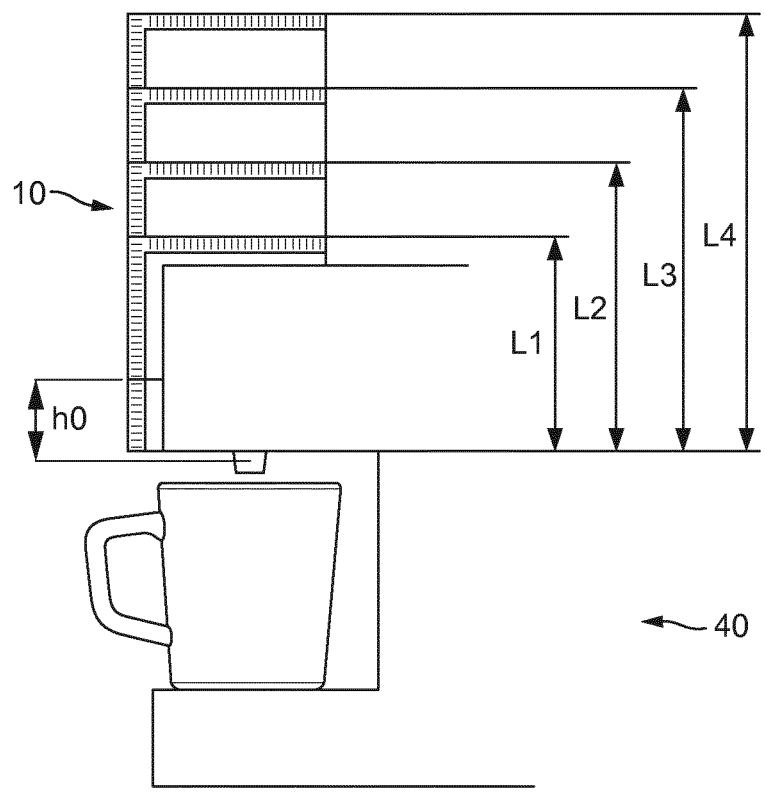
FIG. 6 shows an overview of the range of packs having different sizes which can be used in a system for preparing food or beverages according to the present invention.

Different sizes of the pack 10, as shown in FIG. 6 can be used in a same machine adapted to store different quantities of ingredients: typically, it is the configuration of the fitment assembly 20 as to external shape and piercing requirements of the fluid inlets what determines the machine to use; however, the size of the containers, when extending vertically, as shown in FIG. 6, does not determine or limit the machine. As a consequence, it becomes possible to produce different products, such as for example a cup of espresso coffee or a bowl of soup. The external design and configuration of the fitment assembly 20 will remain unchanged independently on the product targeted; however, the internal design of the fitment assembly 20, in particular as to the diameter of the injection holes will differ as a function of the ingredient to be processed and therefore as a function of the food or beverage product targeted. Also, other parameters such as the flow rate of fluid injected and/or the temperature of the fluid injected and/or the total volume of fluid injected for the single or plurality of containers will be modified as a function of the ingredient to be processed and therefore as a function of the food or beverage product targeted.

According to an embodiment of the invention the range of packs such as described above can comprise at least two types of packs essentially differing by their ability to produce a foamy beverage or a non-foamy beverage. The first type of pack that is able to produce a foamy beverage generally presents a water inlet configured for introducing a water jet in the inner volume of the pack with a higher velocity than the second type of pack. The first type of pack preferably presents a beverage outlet configured for keeping the beverage as long as possible in the inner volume of the pack. Then the injection hole of the first type of pack presents a dispensing outlet with a surface area equivalent to the surface of a circular surface of diameter smallest than for the second type of pack. The first type of pack also preferably presents a shape configured for improving the movement of the fluid and the beverage in the container during beverage or food preparation. It has been observed that rectangular containers presenting a ratio length/width of about 4/3 and with the fitment assembly 20 placed at the width side improve the agitation of the fluid and the generation of foam. This effect is even more accentuated when the fitment assembly 20 is positioned at the side corner of the width with the length. The foaming of the beverage can also depend from the nature of the food or beverage ingredient. The invention enables the production of a range of different packs 10 adapted for the agitation and dissolution of different types of beverage or food ingredients comprised in the containers.

Figure 4A:
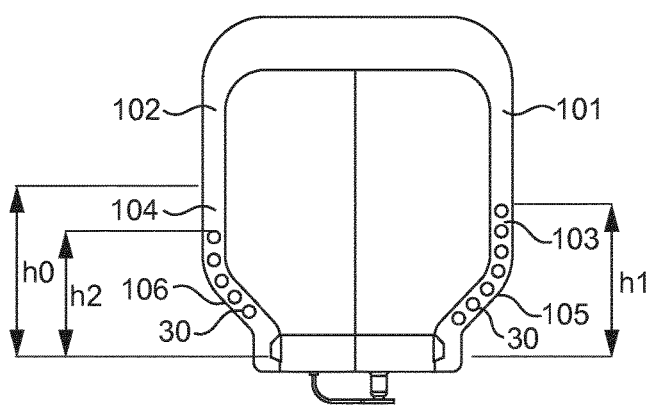
FIGS. 4a and 4b show general front views of a range of packs comprising identification means to be used in a system for preparing food or beverages according to the present invention.
Figure 4B:
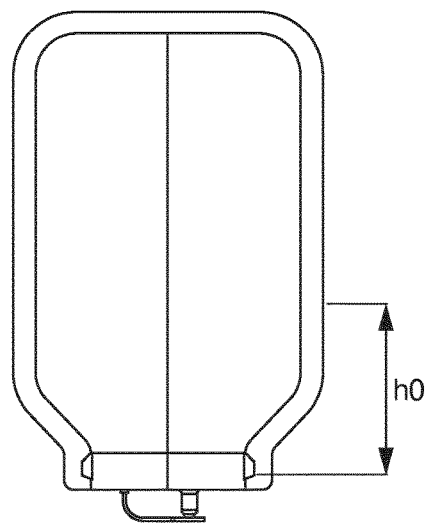

The range of packs, independently on the food or beverage base ingredient contained, will all have a common lower part 200 of a height $h_0$ (as schematically shown in FIGS. 4a and 4b) comprising the fitment assembly 20 and the identification means 30: the packs in the range of packs will thus differ from each other by the upper height above this lower common part 200 of height $h_0$.

Typically, the two flexible water impermeable sheets joined to one another to define the inner volume of the container are formed of one single flexible water impermeable sheet folded in half and joined at its free edges. According to said mode the container is a plane pouch made of a flexible material sheet, said sheet being folded at the top of the container and bonded on its edges to define the inner volume, the bottom bonded edge typically including the fitment assembly 20. This embodiment constitutes a particularly easy way to manufacture the pack 10 comprising the containers and the fitment assembly since it requires the cutting of only one piece of sheet—most preferably according to a rectangular shape—and its folding to create the inner volume for the food or beverage ingredient. Typically, also for manufacturing convenience, the fitment assembly 20 is introduced in the bottom edge of the container during the sealing of its edges.

The fluid inlets are typically enclosed in the complete pack 10 by the sheet(s) of material defining the inner volume of the containers: the yieldable cover over the fluid inlets piercable by the injecting means 41 is therefore made by the sheets of material covering these fluid inlets, so it is not necessary to prepare any supplementary cover or membrane to go over them, so the manufacturing is easy and convenient. Consequently the same piece of material can be used to simultaneously create the inner volume of the container and to close the fluid inlets. As such, the invention provides a pack 10 that is easy to manufacture and which guarantees hygienic and shelf life protection of the food and beverage ingredients and of the produced food or beverage product.

Preferably, the introduction of the fitment assembly 20 in the bottom edge of the container during the sealing of its edges to configure the complete pack 10 makes it possible that the flexible sheet can cover the part of the fitment assembly 20 including the fluid inlet. Consequently during the single step of bonding the edges of the sheet, it is possible to simultaneously create the inner volume for storing the food or beverage ingredient, place the fitment assembly 20 and close the fluid inlet. Preferably the dispensing outlet is not covered by the sheet. Yet it can be visually hidden by a part of the sheet e.g. by a skirt of the sheet.

Also as shown in FIGS. 4a and 4b, the food or beverage containers preferably comprise at least one, more preferably two sloped areas 11 symmetrically arranged presenting slanted shapes in the vicinity of the fitment assembly 20 converging towards the fitment assembly 20, which enhance and facilitate the dispensing of all the product inside the container through the dispensing outlet, such that a minimized quantity of it can be left inside the container, therefore avoiding that beverage or food ingredients remain blocked in these corners. The sloped areas 11 can be obtained by sidewise sealing the corners of the containers. The food or beverage containers can present various external shapes like rectangular, square or round shapes. The inner volume of these containers would preferably present a shape configured for improving the movement of the fluid and the food or beverage ingredient in the container during product preparation.

The pack 10 comprises identification means 30 comprising the information on the process parameters to be applied to the food or beverage base ingredients so that an optimised product is delivered. Preferably, the identification means 30 comprise punched holes configuring a punched-hole code which comprises the information on the process parameters to be applied, depending on the food or beverage base ingredients. Punched-hole codes are particularly simple and inexpensive to produce, since holes are punched at predefined locations in the pack 10. Preferably the punched holes are arranged in a seam or an edge area of the pack 10. Typically, the two flexible sheets configuring the pack 10 are brought together and are sealed (preferably by thermo sealing): in the seam so configured differently arranged seam areas 101, 102, 103, 104, 105 and 106 are created (the referential element for the separation of the different seam areas of one side and another is the fitment assembly 20), as shown in FIGS. 4a and 4b. The punched-hole code is arranged in at least one of the seam areas defined before, preferably in area 103 and/or in 105, or it can be arranged in area 104 and/or in 106. Preferably, according to the invention, the punched-hole code will be arranged in at least one of the seam sides of the pack 10 and arranged at an area located within a maximum height $h_1$ from the fitment assembly 20. This height $h_1$ is determined by the standard common part 200 configuring a range of packs as previously explained and having a height $h_0$. Typically, the identification means 30 are arranged in the part of the pack 10 which is stiffer and has a better stability: as the pack 10 is made being flexible, the part of it which is closer to the fitment assembly 20 (preferably rigid and made of a rigid plastic material) will be provided with higher stability. Besides, the punched-hole code is arranged in this seam area because there is no product there preventing the punching of the code and because the process of food or beverage preparation does not disturb this positioning of the identification means 30.

Preferably, the identification means 30 (typically, the punched-hole code) are arranged on both sides of the pack 10, thus arranged in area 103 and/or in 105 arranged within a maximum height $h_1$, and also in area 104 and/or in 106 arranged within a maximum height $h_2$. In this way, a punched-hole code which is repeated and which comprises more information on the process parameters to be applied and/or which provides information on a higher number of possible food or beverage products to be obtained is possible: this would require a punched-hole code of a higher length which would make that the code would be arranged covering a height bigger than the maximum height $h_1$ allowed by the repeatability of the range of packs and thus of the common part 100. Thus, the punched-hole code will be arranged on both sides, $h_1$ and $h_2$, such that $h_2 \leq h_1$. This code will therefore be repeated in the total punched-hole code sequence a certain number of times which will minimise the possibility of errors in case the code is damaged. Moreover, another capital advantage of positioning the code in the two sides of the pack 10 is that the code can be read symmetrically, independently on the sense in which it has been introduced in the preparation machine, which presents a significant advantage for the consumer, who does not need to pay attention to the sense in which the pack needs to be introduced in the preparation device.

According to the invention, it is possible that the identification means 30 are arranged either on one of the sides of the edges of the container (of the pack 10) so the code is arranged in its entirety on one of the sides, or the identification means 30 can be arranged on both sides of the edges of the container with respect to the fitment assembly 20 such that part of the information of the food or beverage product is on one of the sides and is continued on the other side. Therefore, in this second arrangement (when the code is divided in the two edge sides of the container) the whole information for the preparation of the food or beverage product is partly on one of the sides and partly on the other side. This is particularly useful when the pack 10 comprises a plurality of containers in order to prepare a multiple food or beverage product, as the information for each of the containers must be comprised in the code, so it is obvious that the code is longer.

Also according to the invention, the identification means 30 also comprise specific information on the sense in which the pack has been introduced: in fact, the code comprises specific information on the side on which it is being read by the appropriate means in the preparation machine or device. That is to say, one part of the code will be telling the side on which you are reading, either if you are reading the right side or the left side of the code in the pack.

According to the invention, the code (identification means) can be arranged symmetrically or not in the pack but it will make the pack be reversibly read independently on its configuration.

The identification means 30 comprise information on the parameters to prepare the food or beverage product, typically at least the temperature of the fluid injected/introduced in the pack, the total volume of fluid and the fluid flow introduced. When there is a plurality of containers, these identification means 30 will comprise these parameters for each one of the containers configuring the pack (the code being made longer and therefore being preferably divided in the side edges of the pack).

Another possibility is that the identification means 30 comprise the information on a certain recipe, such that the machine will then have stored certain recipes to apply specific parameters (temperature, fluid flow and total fluid volume) depending on the recipe read.

The holes configuring the punched-hole code can be of any desired shape: preferably, they will be circular, but other shapes such as rectangular, square, triangular, polygonal or any other will also be suitable. The punched holes are made of any desired shape as a function of the edge areas of the container where they are arranged.

In the punched-hole code of the invention, the different encoding of information is preferably done by binary encoding. The device 40 used together with the pack 10 for preparing the food or beverage products will comprise a data reader 50 which will be confronted to the identification means 30 (i.e., to the punched-hole code) once the pack 10 is introduced in the device 40. The data reader 50 will be either configured as an optical sensor or as a mechanical sensor. When configured as an optical sensor, the data reader will comprise a light emitter device emitting light passing through the punched holes configuring the identification means 30.

When the punched-hole code is made in two parts, arranged on both sides of the pack 10, as previously described, the sensor will then be provided with a primary sensor (reading the part of the code arranged in one of the sides, for example arranged in area 103 and/or 105) and with a secondary sensor (reading the part of the code arranged on the other side of the pack, for example arranged in area 104 and/or 106). Independently on the sense of introduction of the pack in the device, the data reader 50 will be configured to retrieve information from both sides of the seams where the code is arranged. Because the code will be repeated a number of times, the possibility of errors is highly minimised.

When the data reader 50 is configured as an optical sensor, the holes will be identified by either being done closed or almost impenetrable to light or by having a punch or perforation which allows light to go through. The data reader 50 (or primary and secondary sensors) will be provided with a plurality of light barriers configured to receive the punched-hole code: the light barriers then allow optical reading of the code. Optical reading has the advantage that the code is read in an entirely contactless manner, which makes it possible to avoid mechanical parts which will be worn over and deteriorated after time or use.

According to another embodiment of the invention, the data reader 50 can be configured as a mechanical sensor: the punched-hole code will be then configured by the combination of open and closed holes and the data reader 50 will comprise for example a plurality of pins engaging with open holes in the code and will be pushed back by closed holes. It is also possible to use readers comprising electrical readers such that the pins engaging in the holes will additionally produce an electrical current.

In any of the embodiments defined above, whether the data reader is configured as an optical or as a mechanical sensor, in order to allow a proper reading of the punched-hole code, it is necessary that the code is correctly confronted with the data reader 50 when the pack 10 is introduced in the device 40. For this purpose, a centring device is provided in the pack 10 to allow this correct positioning. One possibility is that the pack 10 comprises centring holes (not shown) in order to correctly place the pack in the preparation machine or device. However, preferably, the pack 10 of the invention will be centred in the device 40 by the fitment assembly 20 which will therefore act further as centring device. Because the fitment assembly 20 of the pack needs to be correctly positioned in the device 40 so as to allow proper piercing and injection of the fluid by the injecting means 41 the correct positioning of the identification means 30 with respect to the data reader 50 will be designed dependent on this, so no further positioning holes will be needed. Furthermore, this positioning will be accurate as the code is preferably arranged in the vicinity of the fitment assembly 20, so this would enhance even more a correct positioning.

When the pack 10 comprises a plurality of containers 10', 10", etc. in order to make a multiple product, the sheets configuring the plurality of containers will be brought together and closed by seams on the edges in a similar way as the one described for a single container (for a single product preparation). Therefore, the arrangement of the identification means 30 (i.e. of the punched-hole code) will be the same as the one already described. Because the fitment assembly 20 brings together in this case the plurality of containers configuring the pack 10, the centring is thus done in the same way through the fitment assembly 20.

Also according to the invention, the identification means 30 in the pack 10 will also comprise information for the sequential fluid supply from the fluid inlets into the different containers, in case of a pack 10 comprising a plurality of containers 10', 10" etc. This sequential processing of the ingredients in the containers is done as a function of the recipe of the product targeted, so this information on which container should be processed in first place and in second place (typically when the pack 10 comprises two containers 10' and 10") is provided by the identification means 30 to the device or machine where the pack 10 is going to be processed. Because the fitment assembly 20 and therefore the pack 10 are reversible, the user can introduce the pack 10 in one sense or the other in the machine or device and the machine needs to be able to know in which sense the pack 10 has been actually introduced, so that a correct sequential processing of the containers configuring the pack 10 is done, this information being provided by the identification means 30 for the correct final product recipe targeted. Therefore, the identification means 30 need to be provided with the information on the sense in which the pack 10 was actually introduced by the user in the device 40.

The identification means 30 in the pack 10 will comprise the information on the process parameters to be applied by a device 40 where the pack 10 is introduced in order to prepare the food or beverage product in an optimised way. These process parameters are at least one or a combination of the following: temperature of the fluid injected in the single or plurality of containers, total volume of fluid and fluid flow injected in the single or plurality of containers. These parameters are also provided together with the information on the sequential processing of the single or plurality of containers configuring the pack.

Figure 7:
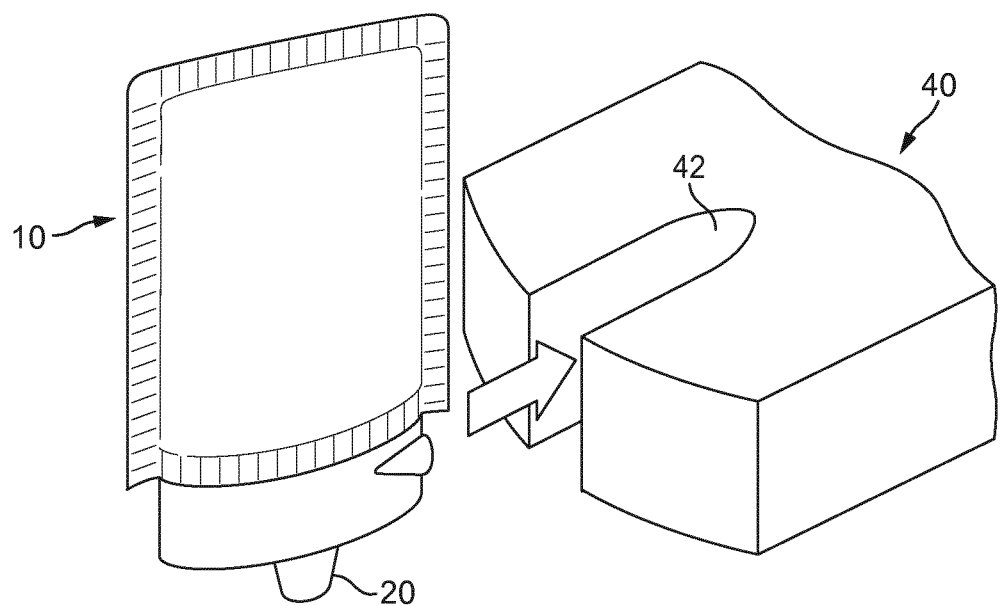
FIG. 7 shows a detail of a device in a system for preparing food or beverages according to the present invention, where the pack is introduced slidably laterally.
Figure 8:
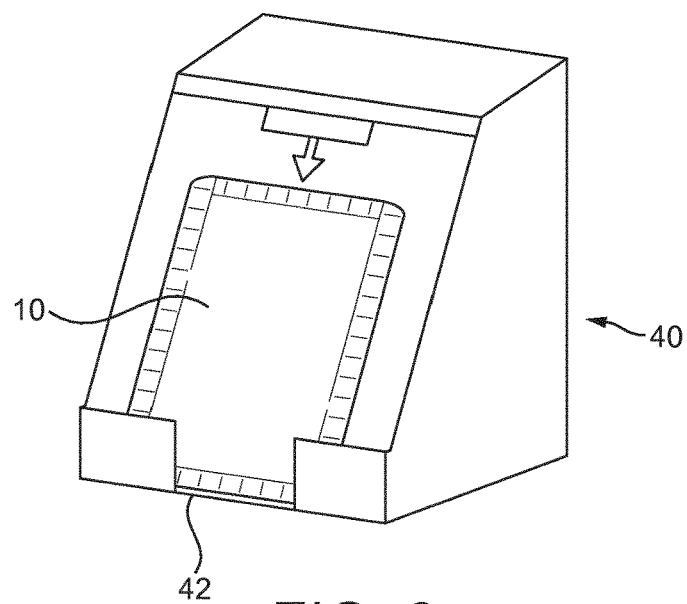
FIG. 8 shows a detail of a device in a system for preparing food or beverages according to the present invention, where the pack is introduced frontally.

According to yet another aspect, the invention refers to a device 40 for preparing single or multiple food or beverage products from a pack 10 as described previously. The device 40 comprises receiving means 42 adapted to accommodate the pack 10 preferably in such a way that the pack is positioned vertically and the fitment assembly is positioned at the bottom of the pack 10, and injecting means 41 (preferably also being piercing means, typically a fluid needle) designed for engaging with the fitment assembly 20 and for injecting high pressure fluid inside the fluid inlets of the fitment assembly 20. Typically, as the pack 10 is processed to obtain the beverage or food product in an essentially vertical position in the device 40, the pack 10 will be introduced either frontally in the device (as schematically represented in FIG. 8) or laterally, so that the pack 10 is slidably inserted into a dedicated insert in the device 40 (as schematically represented in FIG. 7).

According to the present invention, the fluid can be supplied to the pack 10 at any temperature, cold, ambient or hot, depending on the type of food or beverage product targeted.

Figure 5:
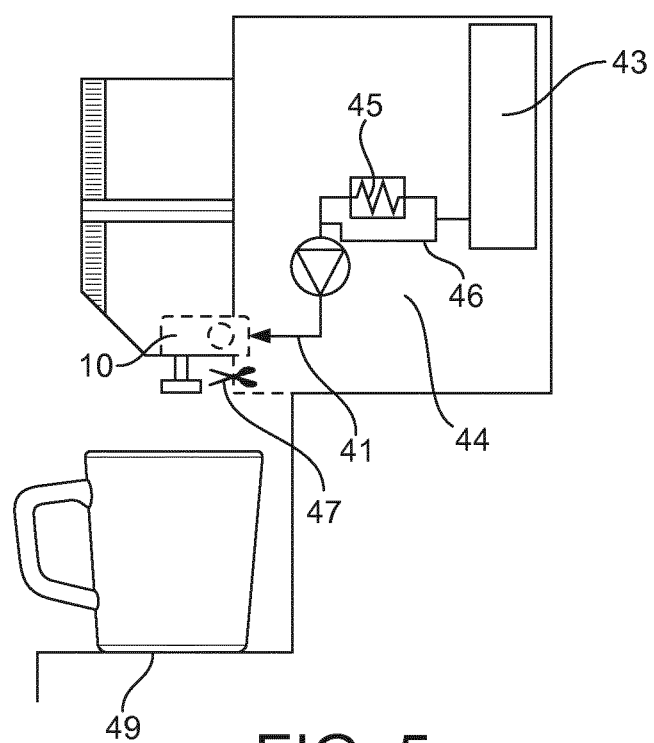
FIG. 5 shows a general view of the system for preparing food or beverages according to the present invention.

According to the invention and as schematically illustrated in FIG. 5, a device 40 for preparing food or beverage products from a pack 10 as described previously can also comprise:

a fluid supply or tank 43 and a pump 44 for supplying pressurized fluid to the fluid inlets in the fitment assembly 20;

a heater 45 for eventually heating the fluid;

a bypass line 46 for delivering fluid at ambient temperature;

a valve (not illustrated) for the selection of either hot or ambient fluid, optionally, a cooling unit (not shown) can also be provided in the device 40 for delivering cold fluid;

injecting means 41, preferably piercing and injecting means, more preferably one or a plurality of fluid needles, piercing the fluid inlets and injecting the pressurized fluid coming from the fluid supply into the fluid inlets;

optionally, a device 47 for cutting or tearing the plugs 27.

The device 47 for cutting or tearing the plugs 27 is preferably arranged in the device in such a way that the plugs are automatically cut when the pack 10 is introduced in the device or when the food or beverage preparation is activated.

The device 40 also comprises a data reader 50 (configured as an optical or as a mechanical reader) which reads and retrieves the information from the identification means 30 regarding the process parameters to be used for preparing the food or beverage product from the pack 10 (sequential processing of the single or plurality of containers, temperature, flow rate and total flow of fluid for the single or plurality of containers).

Preferably the device further comprises a positioning area 49 for allocating a drinking cup under the dispensing outlet of the pack 10 when a food product or a beverage is prepared.

Also as per the invention, a method for manufacturing a pack 10 such as described above, the pack 10 comprising a fitment assembly 20 and one or a plurality of food or beverage containers would comprise the steps of:

folding a sheet of material and bonding both lateral edges of it to form a pouch;

filling the pouch so formed through the remaining open edges with a food or beverage ingredient;

positioning the fitment assembly 20 between the remaining open edges and bonding said edges;

punching the holes in order to configure the identification means 30.

Some of the main advantages provided by the system of the present invention are now detailed herewith:

- a range of packs having a common lower part also provided with the fitment assembly and with the part of the pack comprising the identification means is used in the same device, allowing a higher range of beverages and food products to be made in a same machine or device, such that these packs will differ from each other on the total height (considering that the pack is arranged essentially vertical when the food or beverage product is produced); this allows higher repeatability of parts and optimized manufacturing costs and replacement parts;
- because the code can be repeated a number of times, the possibility of error reading and of the code being damaged is highly minimized;
- the system is very easy and convenient to use by the consumer as it is reversibly conceived, such that the identification means can be read independently on the sense in which the pack is arranged in the device and fluid can also be injected in the pack through the fitment assembly independently on the sense of introduction of the pack, which facilitates its use.

Although the present invention has been described with reference to preferred embodiments thereof, many modifications and alternations may be made by a person having ordinary skill in the art without departing from the scope of this invention which is defined by the appended claims.

LIST OF REFERENCES

100 System
10 Pack
  10' Container
  10" Container
  10''' Container
  20 Fitment assembly
  30 Identification means
  21 Primary fluid inlet
  24 Primary injection hole
  22 Secondary fluid inlet
  25 Secondary injection hole
  23 Dispensing fluid outlet
  230 Opening in fluid outlet
  27 Plug
  11 Sloped area in pack
  101 Seam part in pack
  102 Seam part in pack
  103 Seam part in pack
  104 Seam part in pack
  105 Seam part in pack
  106 Seam part in pack
  200 Common lower part in range of packs
  $h_0$ Height of common lower part of range of packs
  $h_1$ Height/Length where one part of identification means are arranged
  $h_2$ Height/Length where another part of identification means are arranged
40 Device
  50 Data reader
  41 Injecting means
  42 Receiving means
  43 Fluid tank
  44 Fluid pump
  45 Heater
  46 Bypass line
  47 Device for tearing plugs
  49 Positioning area

The invention claimed is:

1. A pack for preparing a food or beverage product, the pack comprising:

at least one container having an inner volume where at least one base ingredient for the preparation of the food or beverage product is stored, the inner volume being defined by sheets of material joined to one another at edges thereof, the edges comprising a first edge and further comprising a second edge at an opposite end of the sheets from the first edge;

a fitment assembly arranged on the first edge of the container, the food or beverage product is delivered through the fitment assembly, the fitment assembly comprising a fluid inlet leading from an exterior of the container to an injection hole of the fitment assembly emerging into the inner volume of the container, the fitment assembly further comprising a dispensing fluid outlet leading from the inner volume of the container to an opening emerging to the exterior of the container at a bottom of the fitment assembly; and an identification member comprising information of the food or beverage product to be prepared, wherein the identification member is arranged at least on at least one of the edges of the container, and the identification member being further arranged such that a distance from the identification member to the fitment assembly is less than a distance from the identification member to the second edge of the container.

2. The pack according to claim 1, wherein the identification member is arranged on a first side and a second side of the first edge of the container with respect to the fitment assembly, the identification member being arranged so that part of the information of the food or beverage product is on the first side and is continued on the second side.

3. The pack according to claim 1, wherein the identification member is arranged on a first side and a second side of the first edge of the container with respect to the fitment assembly, the identification member being further configured to comprise the information of the food or beverage product a plurality of times.

4. The pack according to claim 1, wherein the identification member is configured to be reversibly read independently of the orientation in which the pack has been introduced into a preparation device.

5. The pack according to claim 1, wherein the identification member is arranged partly on a first side of the container up to a length ($h_1$) and partly on a second side of the container up to a length ($h_2$), configured in such a way that $h_2 \leq h_1$.

6. The pack according to claim 1, wherein the identification member comprises punched holes configured as a punched-hole code.

7. The pack according to claim 1, wherein the identification member is configured either as an optically-read code or as a mechanically-detected code.

8. The pack according to claim 1, the pack further comprising a plug configured to close the dispensing fluid outlet, the plug is part of the fitment assembly which is one single fitment assembly comprising the dispensing fluid outlet and the fluid inlet.

9. The pack according to claim 1, wherein the dispensing fluid outlet is a straight tube oriented vertically in the fitment assembly.

10. The pack according to claim 1, wherein the opening of the dispensing fluid outlet has a diameter between about 1 mm and about 4 mm.

11. The pack according to claim 1, wherein the injection hole has a diameter between about 0.24 mm and about 1 mm.

12. The pack according to claim 1, wherein the fitment assembly has a top at an opposite end of the fitment assembly from the bottom, and the injection hole and an aperture into the dispensing fluid outlet are both positioned in the top of the fitment assembly.

13. The pack according to claim 12, wherein the fitment assembly comprises a side connecting the top to the bottom, and the fluid inlet opens to the exterior on the side of the fitment assembly.

14. A system for preparing a food or beverage product, the system comprising a pack, the pack comprising:
- at least one container having an inner volume where at least one base ingredient for the preparation of the food or beverage product is stored, the inner volume being defined by sheets of material joined to one another at edges thereof, the edges comprising a first edge and further comprising a second edge at an opposite end of the sheets from the first edge,
- a fitment assembly arranged on the first edge of the container the food or beverage product is delivered through the fitment assembly, the fitment assembly comprising a fluid inlet leading from an exterior of the container to an injection hole of the fitment assembly emerging into the inner volume of the container, the fitment assembly further comprising a dispensing fluid outlet leading from the inner volume of the container to an opening emerging to the exterior of the container at a bottom of the fitment assembly, and
- an identification member comprising information of the food or beverage product to be prepared;
wherein the identification member is arranged on at least one of the edges of the container, and
the identification member being further arranged such that a distance from the identification member to the fitment assembly is less than a distance from the identification member to the second edge of the container; and
the system further comprising a device where the food or beverage product is prepared, the device comprising a data reader configured to read the identification member on the pack when the pack is positioned in the device.

15. The system according to claim 14, wherein the data reader comprises a light emitter device to retrieve the information of the product from the identification member in the pack.

16. The system according to claim 15, wherein the data reader comprises a plurality of pins configured for engaging with the identification member in the pack.

17. The system according to claim 14, wherein the fitment assembly is configured to display the identification member on the pack to the data reader when the pack is positioned in the device.

18. The system according to claim 14, further comprising a plug configured to close the dispensing fluid outlet, the plug is part of the fitment assembly which is one single fitment assembly comprising the dispensing fluid outlet and the fluid inlet.

19. The system according to claim 14, wherein the fluid inlet is configured for fluid to be injected from the machine into the inner volume of the container.

* * * * *